United States Patent [15] 3,644,224
Hani et al. [45] Feb. 22, 1972

[54] PROCESS FOR POLYMERIZING EPOXIDES

[72] Inventors: Hiroshi Hani; Yasushi Masuda, both of Kanagawa-ken, Japan

[73] Assignee: Asahi Glass Co., Ltd., Tokyo, Japan

[22] Filed: Sept. 25, 1969

[21] Appl. No.: 862,162

[30] Foreign Application Priority Data

Oct. 4, 1968 Japan....................................43/71840

[52] U.S. Cl. ............................260/2 A, 252/431, 260/615 B
[51] Int. Cl. ..................................C08g 23/06, C08g 23/14
[58] Field of Search..........................................260/2, 615 B

[56] References Cited

UNITED STATES PATENTS

| | | | |
|---|---|---|---|
| 3,058,922 | 10/1962 | Vandenberg | 260/2 |
| 3,058,923 | 10/1962 | Kutner | 260/2 |
| 3,186,958 | 6/1965 | Kutner et al. | 260/2 |

Primary Examiner—William M. Short
Assistant Examiner—E. Nielsen
Attorney—Kurt Kelman

[57] ABSTRACT

In the polymerization of an epoxide, a high conversion of the monomer to the polymer and a high yield of solid polymer are attained by use of a new catalyst which is formed by reacting an imide with the reaction product of a hydrocarbon-aluminum compound with an ether. The amount of the catalyst required is small in comparison with the conventional processes.

12 Claims, No Drawings

PROCESS FOR POLYMERIZING EPOXIDES

BACKGROUND OF THE INVENTION

This invention relates to a new process for polymerizing epoxides and, more particularly, to a new process for homopolymerizing or copolymerizing at least one kind of epoxide in the presence of a new catalyst.

In recent years the homopolymers and copolymers of various epoxides such as ethylene oxide, propylene oxide and epichlorohydrin have been used in such applications as rubber articles. For example, they have excellent in weather resistance, oil and solvent resistance, impermeability to gases and ozone resistance. For producing such epoxide polymers, there are several known processes wherein one or more epoxide monomers are polymerized in the presence of a catalyst which is obtainable by reacting an organoaluminum compound with water or a chelating agent (U.S. Pat. Nos. 3,135,705 and 3,135,706) or a catalyst obtainable by reacting a hydrocarbon aluminum compound with a basic nitrogen-containing compound (U.S. Pat. No. 3,186,958). However, in those polymerization processes, neither the conversion of epoxide monomers to polymers nor the yield of solid high polymers is always as high as might be desired. Furthermore, in the conventional polymerization processes, the amount of the organoaluminum catalyst required actually amounts to several molar percent or more based on the epoxide monomer. The outcome is that the method involves the use of large amounts of the organoaluminum compound which is expensive, and this results in a considerable increase in the cost of commercial production of epoxide polymers.

SUMMARY OF THE INVENTION

It is an object of the invention to provide a novel process for polymerizing epoxides in the presence of a new catalyst which is not known to the prior art.

Another object is to provide a new process for polymerizing epoxides, wherein the amount of the catalyst required is relatively small as compared with the conventional art.

Still another object is to provide a new process for polymerizing epoxide which yields epoxides polymers having satisfactory rubberlike elasticity.

Other objects of the invention will be apparent from the detailed description of the invention that follows.

DETAILED DESCRIPTION OF THE INVENTION

After extensive work on the polymerization of epoxides with a view of improving the conventional processes, we have discovered a process for polymerizing epoxides advantageously on a commercial scale by the use of a new catalyst which differs from the conventional organoaluminum catalysts.

Thus, we found that the catalyst obtainable by reacting a hydrocarbon aluminum compound with an ether and reacting the resulting reaction product with an imide shows an extremely high activity for the polymerization of epoxides.

It was also found that when epoxides are polymerized in the presence of such a catalyst, a high conversion rate is attained and that this high conversion of the monomer to the polymer is accomplished using a relatively small amount of the catalyst as compared with the conventional processes. In addition, it was further discovered that by varying the types of ether used in the preparation of the catalyst, it is possible to produce polymers having varied properties from amorphous rubberlike polymers to crystalline polymers. This invention is the culmination of the foregoing discoveries.

Thus, the present invention relates to a process for homopolymerizing or copolymerizing one or more different epoxides in the presence of a catalyst obtainable by the reaction of an imide with the reaction product of hydrocarbon aluminum compound and an ether.

The new catalyst to be employed in the polymerization process according to this invention is prepared in the following manner. In the first place, any hydrocarbon aluminum compound having the formula $AiR_3$ where at least one R is a hydrocarbon radical and remaining R's are hydrogen or hydrocarbon radical may be used in this invention. Exemplary of these hydrocarbon aluminum compounds are trialkylaluminums such as trimethylaluminum, triethylaluminum, tripropylaluminum, triisopropylaluminum, tri-n-butylaluminum, triisobutylaluminum, trihexylaluminum, trioctylaluminum, tridodecylaluminum, etc., alkylaluminum hydrides such as diethylaluminum hydride, dimethylaluminun hydride, diisobutylaluminum hydride, etc., the corresponding alkenyl, cycloalkyl, cycloalkenyl, aryl and aralkyl aluminum compounds as, for example, triisopropenylaluminum, tricyclohexylaluminum, tricyclohexenylaluminum, triphenylaluminum, tribenzylaluminum, etc., or a mixture of these aluminum compounds.

The ether mentioned above may be a cyclic ether having a four-to-six membered ring such as cyclooxabutane, tetrahydrofuran, tetrahydropyran, dioxane or dioxolan, a linear ether such as diethylether, diisopropylether, anisole, phenetol, diphenylether, ethylene glycol dimethyl ether, diethylene glycol dimethyl ether or triethylene glycol dimethyl ether, a substitution product of any of such cyclic and linear ethers, or a mixture of the aforesaid ethers.

The aforesaid reaction product of a hydrocarbon aluminum compound with an ether is obtained by reacting a hydrocarbon aluminum compound with one of the ethers given above. The structure of this reaction product remains yet to be thoroughly elucidated, but it is reasonable to assume from the information provided in J. Am Chem. Soc, 64, 316 (1942) that it is the addition product of the hydrocarbon aluminum compound and the ether used. In any event, the aforesaid reaction product is obtained when said hydrocarbon aluminum compound is mixed with said ether. Those reactants may be reacted on an equimolar basis, or either of them may be used in excess. However, the preferred molar ratio of the ether to the hydrocarbon aluminum compound ranges from about 0.3 to 20 and, for better results, from about 1 to 7.

When the above reaction is effected outside of the first mentioned range, the activity of the catalyst attainable according to this invention is greatly reduced, if not completely erased. It has also been found that the final catalyst has a higher activity when the ether to be reacted with the hydrocarbon aluminum compound is a cyclic rather than a linear ether.

The resulting reaction product of hydrocarbon aluminum compound and ether is then reacted with an imide either directly or after the unreacted materials are removed from the reaction mixture. As the aforesaid imide, any cyclic imide or its derivatives which are derived from dibasic carboxylic acid may be used. Exemplary of these imides or their derivatives are succinimide, glutarimide, adipimide, maleinimide, malonimide and phthalimide or their hydrocarbon substitution products or N-halogen-substitution products. These imides are employed either singly or in combination. The amount of the imide to be reacted with the aforesaid reaction product of a hydrocarbon aluminum compound and an ether is critical and must be within a range from 0.01 to 2 moles per mole of the hydrocarbon aluminum compound and, preferably, 0.1 to 1 mole on the same basis. And the reaction of an imide with the reaction product of an hydrocarbon aluminum compound and an ether is usually carried out within the temperature range of 0° to 200° C. and, preferably, from room temperature to 100° C., either in the absence of a solvent or in a solvent inert to the reaction, for example suitable hydrocarbons such as benzene, toluene, n-heptane, cyclohexane etc., or a halogenated hydrocarbon such as chlorobenzene, carbon tetrachloride etc. A feature of the reaction of the reaction product of said hydrocarbon aluminum compound and ether with said imide is that the color of the reaction mixture changes with the progress of the reaction. In contrast, when the same hydrocarbon aluminum compound is directly reacted with the same imide as above, the color assumed by the reaction mixture immediately upon the admixing of the reactants remains unchanged throughout the reaction.

The change in color of the reaction mixture is rather pronounced, and it has been found that, if the reaction mixture before it undergoes such a color change is used as the catalyst, its activity is extremely low. On the other hand, the same reaction mixture gives a high catalytic activity if it is used after a sufficient degree of color change has taken place. Therefore, this color change can be made use of not only as a measure with which the endpoint of the reaction of the reaction product of a hydrocarbon aluminum compound an an ether with the imide can be ascertained but also as a yardstick with which the activity of the resulting catalyst can be determined. While the time required for the color change of the reaction system to take place depends upon the types of catalyst components and the reaction temperature, it usually takes from a few minutes to a few hours.

In the preparation of the catalyst according to this invention, it has been found that the reaction between a hydrocarbon aluminum compound and an ether is considerably more rapid than the reaction between the same hydrocarbon aluminum compound with an imide. Therefore, the aforedescribed procedure of mixing the hydrocarbon aluminum compound with the ether and, then, reacting the imide with the mixture is not always mandatory. For instance, the catalyst according to this invention may be prepared by adding the ether and imide simultaneously to the hydrocarbon aluminum compound. However, if the ether is added last of all the three components, e.g., if the ether is added to the reaction mixture of said hydrocarbon aluminum compound and imide, the aforementioned reaction product of hydrocarbon aluminum compound and ether is not formed and, accordingly, the resulting catalyst has only a quite inadequate activity.

Furthermore, the catalyst according to this invention should be contacted with the epoxide monomer only after it has been prepared. This is due to the fact that the reaction of the reaction product of a hydrocarbon aluminum compound and an ether with an imide is relatively slow as previously mentioned.

Any epoxides may be homopolymerized or copolymerized with a second epoxide by the process of this invention. Outstanding results are obtained with epoxides wherein the epoxy group is an oxirane ring such as ethylene oxide, propylene oxide, butylene oxide, epichlorohydrin, epibromohydrin, epifluorohydrin, n-butene oxide, styrene oxide, allylglycidyl ether, phenylglycidyl ether, cyclohexeneoxide, perfluoroethylene oxide, perfluoropropylene oxide, etc.

The polymerization reaction may be conducted either batchwise or continuously, and any suitable reaction vessel can be utilized for the purpose. The epoxide monomer and the catalyst may be introduced simultaneously into the reactor, or one after the other. It is permissible to add either of them in a single batch, continuously over the polymerization period or in several installments. The polymerization reaction according to this invention may be conducted in the presence of an inert diluent or in the manner of bulk polymerization. The inert diluent mentioned just above may be any diluent that will remain inert under the polymerization conditions. For example, hydrocarbons such as benzene, toluene, n-heptane, cyclohexane etc., halogenated hydrocarbons such as carbon tetrachloride, chlorobenzene etc., ethers such as diethylether, dipropylether, dioxane, etc., may be mentioned. In the case of bulk polymerization, for the purpose of controlling the temperature, it is permissible to conduct the reaction under reflux at the boiling point of the epoxide monomer.

The polymerization temperature ranges from $-100°$ to $+200°$ C. and, preferably $0°$ to $100°$ C.

While the reaction is usually carried out under autogenous pressure, it may be conducted at pressures up to about 200 atmospheres, if required. It is also possible to carry out the reaction under reduced pressure.

The process of the invention is characterized in that the amount of catalyst required is much lower than that required in the conventional processes. Thus, it has been confirmed that the amount of the catalyst required in this invention is sufficient in the range from 0.05 to 0.5 mol percent based on the epoxy monomer used. This range represents a considerable reduction from the effective amount of the conventional organoaluminum compound catalyst. However, the catalyst according to the invention may be used in larger amounts, up to about 10 mol percent based on the epoxy monomer. The amount of the catalyst required depends upon the type and purity of the epoxide, the purity of the inert diluent being used and other factors. For example, the epoxides of low purity require a larger amount of the catalyst. In this connection, in order that as small an amount of the catalyst as possible will suffice, the starting material is preferably as pure as possible. However, in accordance with the invention, since the activity of the catalyst is considerably higher than the conventional catalysts, even a starting material containing somewhat larger amounts of impurities may be employed satisfactorily without preliminary purification.

The homopolymer or copolymer of one or more epoxides which are thus obtainable according to this invention has varying properties, ranging from one which is rubberlike to a crystalline product, depending upon the types of ether used in the catalyst. The former type of product has an extensive range of applications, such as lube oil additives, wax additives, adhesive components, etc. and, after curing, in gaskets, hoses and other formed articles. On the other hand, the latter crystalline product is useful as a material in the manufacture of plastics, film formers and fibers.

The following examples are further illustrative of the invention. It should be understood that the invention should by no means be construed as being limited by those examples, but many changes and modifications may be made without departing from the scope and spirit of the invention described in the appended claims.

EXAMPLES 1-3

TABLE 1

| Example number | Type of imide | Color of liquid catalyst | Conversion of epichlorohydrin (percent) | Characteristics of epichlorohydrin polymer |
|---|---|---|---|---|
| 1 | Succinimide | Yellowish orange | 100 | Rubbery. |
| Control | do | Pale yellow | 12 | Non elastic. |
| 2 | Maleinimide | Blue black | 97 | Rubbery. |
| Control | do | Yellowish orange | 50 | Non elastic. |
| 3 | N-chlorosuccinimide | Blue black | 82 | Rubbery. |
| Control | do | Pale yellow | 9 | Non elastic. |

In these examples, as well as in the examples that follow, all the reactions were carried out in nitrogen gas streams. 1 mole/l of a solution of triisobutylaluminum in toluene was mixed with a molecular equivalent of dioxane at room temperature whereupon a reaction mixture containing the reaction product of the triisobutylaluminum and dioxane was obtained. This reaction mixture was mixed with 0.25 molar equivalent of one of the imides shown in Table 1 at 40° C. for 1 hour, whereupon a liquid catalyst was obtained. On the other hand, a reactor was charged with 12.9 g. epichlorohydrin and 65 g. chlorobenzene, followed by the addition of 28 millimole, relative to the aluminum, of the aforesaid liquid catalyst. With the reactor being maintained at a temperature of 30° C., the reaction was allowed to continue for about 24 hours. The contents were withdrawn and stirred with ethanol, whereupon a solid polymer was obtained. This solid polymer was immersed in ethanol containing 0.5 percent of 4,4'-thio-bis- 6-t-butyl-m-cresol, and, dried under reduced pressure. Table 1 shows the types of imide used, the color of the liquid catalysts obtained, the conversion of epichlorohydrin and the characteristics of the resulting epichlorohydrin polymers in those examples. As controls, the reaction mixtures prepared by reacting triisobutylaluminum with the various imides without use of dioxane, were used as catalysts and the reactions were conducted under the same conditions as above. The results are also shown in Table 1.

It will be apparent from Table 1 that compared with the controls, those examples of the invention give much higher conversions of epichlorohydrin monomer to epichlorohydrin polymer, that the resulting epoxide polymers are amorphous and that the colors of the liquid catalysts differ considerably from those of the control catalysts.

EXAMPLES (controls) 4–7

Epichlorohydrin was polymerized under the same conditions as in Example 1, except that the various nitrogen-containing compounds (N compd.) given in Table 2 were used in place of an imide. The results are set forth in Table 2. In the controls of Table 2, no dioxane was used, as in the controls of Table 1.

The color of the reaction mixture of the example and its corresponding control was almost same.

It will be apparent from Table 2 that without the use of dioxane in the catalyst no high molecular weight polymer is obtained in high yield.

TABLE 2

| Example number | Type of N compound | Molar reaction ratio of N compound/ Al compound | Conversion of epichlorohydrin, percent | Characteristics of epichlorohydrin polymer |
| --- | --- | --- | --- | --- |
| 4 | Triethylamine | 0.4 | 100 | Non solid polymer. |
| Control | do | 0.4 | 98 | Do. |
| 5 | Dimethylurea | 0.25 | 15 | Solid polymer. |
| Control | do | 0.25 | 20 | Do. |
| 6 | Pyrrolidone | 0.25 | 15 | Do. |
| Control | do | 0.25 | 14 | Do. |
| 7 | Acryl amide | 0.25 | 34 | Do. |
| Control | do | 0.25 | 27 | Do. |

EXAMPLES 8–10

Triisobutyl aluminum, dioxane and succinimide were reacted at 40° C. in the molar ratios and sequences set forth in Table 3. In each example, using 0.5 mole percent, based on the triisobutylaluminum, of the resulting liquid catalyst and, as a diluent, chlorobenzene, the polymerization was conducted at 30° C. The initial concentration of epichlorohydrin was 2 mole/l. The reaction rates of epichlorohydrin in these examples are shown in Table 3. Incidentally, the reaction sequences of catalyst components in Table 3 were such that, taking Example 8 as an example, succinimide and dioxane, which are bracketed, were previously mixed together in the molar ratio of 0.25 to 3.0 and the resulting solution was further mixed with 1.0 mole and triisobutylaluminum based on 0.25 mole of succimide contained in said solution. The same applies to the control.

TABLE 3

| Example No. | Sequence of addition | Conversion of epichlorohydrin (%) |
| --- | --- | --- |
| 8 | (0.25 succinimide-3.0 dioxane-1.0 triisobutylaluminum | 92 |
| 9 | 1.0 triisobutylaluminum-(0.25 succinimide-3.0 dioxane) | 97 |
| 10 | 0.25 succinimide-(1.0 triisobutylaluminum-3.0 dioxane) | 98 |
| Control | (1.0 triisobutylaluminum-0.25 succinimide)-3.0 dioxane | 6 |

EXAMPLES 11–12

Triisobutylaluminum, dioxane and succinimide were mixed together in the same molar ratios, for the same reaction times and in the same sequences as Examples 1 and 2, at the temperatures shown in Table 4.

Using the resulting liquid catalysts, the polymerization reactions were respectively carried out under otherwise the same conditions as Example 1. Table 4 shows the temperatures at which the catalysts were prepared, the colors of the resulting liquid catalysts, conversion of epichlorohydrin and the characteristics of the resulting epichlorohydrin polymers. The control catalyst was prepared without use of dioxane. Thus, the reaction mixture of triisobutylaluminum and succinimide was directly employed and the polymerization reaction was conducted under otherwise the same conditions as the above examples of this invention.

TABLE 4

| Example Number | Temperature[1] | Color of liquid catalyst | Conversion of epichlorohydrin (percent) | Crystallinity of epichlorohydrin polymer |
| --- | --- | --- | --- | --- |
| 11 | 40 | Yellowish orange. | 42 | Essentially amorphous. |
| Control | 40 | Pale yellow. | 3 | Highly crystalline. |
| 12 | 70 | Reddish orange. | 100 | Do. |
| Control | 70 | Yellow | 3 | Do. |

[1] At which catalyst was prepared.

As to the control, there is observed no variation in result due to changes in the temperature at which the catalysts were prepared. In contrast, it will be seen that in the case of the catalysts according to the invention, both the activity of the catalysts and the crystallinity of the epichlorohydrin polymers are markedly changed by the temperature at which the catalysts are prepared.

EXAMPLES 13–14

Except that the catalyst preparation temperature was held at 40° C. and the time of the reaction (catalyst preparation time) of the reaction product of triisobutylaluminum and dioxane with succinimide was varied, epichlorohydrin was polymerized under otherwise the same conditions as in Examples 11–12.

Table 5 shows the catalyst preparation times, the colors of the resulting liquid catalysts and the reaction rates of epichlorohydrin. The control catalyst was prepared without use of dioxane. Thus, the reaction mixture obtained by reacting triisobutylaluminum with succinimide alone was employed, and the polymerizations were carried out under otherwise the same conditions as in the above examples.

TABLE 5

| Example No. | Catalyst preparation time (min.) | Color of liquid catalyst | Conversion of epichlorohydrin (%) |
| --- | --- | --- | --- |
| 13 | 12 | Pale yellow | 12 |
| Control | 12 | Pale yellow | 12 |
| 14 | 60 | Reddish orange | 42 |
| Control | 12 | Pale yellow | 3 |

Regarding the controls, substantially no change was observed due to the change in catalyst preparation time. In contrast, the case of the catalyst according to the invention, the catalyst activity was markedly enhanced with the increase in catalyst preparation time.

EXAMPLES (controls) 15–18

0.7 millimole triisobutylaluminum, 0.018 g. succinimide and 12.9 g. epichlorohydrin were reacted together with various propositions of chlorobenzene and dioxane as set forth in Table 6 in a varying sequence also shown in the same table. The reaction was conducted at the temperature of 30° C. for 24 hours. The sequences of mixing the aforesaid components, the amounts of chlorobenzene and dioxane added and the conversion of epichlorohydrin are set forth in Table 6.

TABLE 6

| Example No. | Sequence of addition | Amount of chlorobenzene (g.) | Amount of dioxane (%) | Conversion of epichlorohydrin (%) |
|---|---|---|---|---|
| 15 | Al added to a mixture of CB, DOX, SI and ECH | 65 | 0.19 | 7 |
| 16 | Al added to a mixture of DOX, SI and ECH | 0 | 65 | 0 |
| 17 | Al added to a mixture of DOX, SI and ECH | 0 | 0.06 | 18 (nonsolid polymer) |
| 18 | SI added to a mixture of CB, DOX, ECH and Al | 65 | 0.38 | 8 |

In Table 6, CB denotes chlorobenzene, DOX dioxane, SI succinimide, ECH epichlorohydrin and Al triisobutylaluminum.

It will be seen from Table 6 that if any one of the catalyst components is added after the addition of epoxide monomer, the catalyst activity invariably is considerably low.

EXAMPLE 19

The reaction product of triisobutylaluminum with 3 molar equivalents of dioxane was mixed with 0.25 molar equivalent of succinimide and the mixture was allowed to react at 70° C. for 1 hour. A reactor was supplied with 46.3 g. epichlorohydrin, followed by the addition of 25 millimole based on the aluminum, of the liquid catalyst prepared above. The polymerization was started with a vigorous evolution of heat at the moment of the mixing. Then, the reaction was continued at the temperature of 30° C. for about 24 hours. The resulting reaction mixture containing an epichlorohydrin polymer was treated in the same manner as in Example 1, whereupon 14.1 g. of solid polyepichlorohydrin was obtained.

EXAMPLE 20

The preparation was conducted in the same manner as in Example 15, except that diisobutylaluminum hydride was used in place of triisobutylaluminum. A reactor were supplied with 12.9 g. epichlorohydrin and 65 g. chlorobenzene, followed by the addition of 2.8 millimole, based on the aluminum, of the liquid catalyst prepared above. The polymerization was started with a vigorous evolution of heat at the moment of the mixing. Then, the reaction was continued at the temperature of 30° C. for about 24 hours. The resulting reaction mixture containing an epichlorohydrin polymer was treated in the same manner as in Example 1, whereupon 7.3 g. of solid polyepichlorohydrin was obtained.

EXAMPLES 21–30

Epichlorohydrin was polymerized under the same conditions as in Example 1, except that the various ethers given in Table 7 were used in place of dioxane. The results are set forth in Table 7. It will be apparent from Table 7 that in the process of the invention, the characteristics of the epichlorohydrin polymer can be modified as desired by using different types of ether.

TABLE 7

| Example No. | Types of ether | Conversion of epichlorohydrin % | Characteristics of epichlorohydrin polymer |
|---|---|---|---|
| 21 | Tetrahydrofuran | 90 | Crystalline |
| 22 | Tetrahydrofuran | 37 | Amorphous |
| 23 | 2-Methyltetrahydrofuran | 16 | Amorphous |
| 24 | m-Dioxane | 15 | Amorphous |
| 25 | Ethyl ether | 12 | Crystalline |
| 26 | Ethylene glycol dimethyl ether | 52 | Amorphous |
| 27 | Diethylene glycol dimethyl ether | 13 | Amorphous |
| 28 | Triethylene glycol dimethyl ether | 12 | Amorphous |

EXAMPLE 29

A reactor was supplied with 5.3 g. ethylene oxide and 59.3 g. chlorobenzene, followed by the addition of 0.7 millimole, relative to the aluminum, of the catalyst prepared in the same manner as Example 1. The reaction was continued at the temperature of 30° C. for about 24 hours. At the end of the reaction time the contents of the reactor were stirred with a large excess of petroleum ether. The above procedure yielded a solid polyethylene oxide. The yield of the polyethylene oxide was 69 percent on a dry-weight basis.

EXAMPLE 30

A 1 mole/l solution of triisobutylaluminum in toluene was mixed with a molar equivalent of tetrahydrofuran at room temperature, followed by the addition of 0.25 molar equivalent of succinimide. The reaction was conducted at 40° C. for 1 hour to prepare a liquid catalyst. A reactor was supplied with 81 g. propylene oxide and 66 g. chlorobenzene, followed by the addition of 0.7 millimole, relative to the aluminum, of the above liquid catalyst. The reaction was allowed to continue at 30° C. for about 24 hours. At the end of the reaction time steam was introduced into the contents of the reactor to purge the chlorobenzene and unreacted propylene oxide. The residue was dried at 60° C. and under reduced pressure. The yield of the product polypropylene oxide was 2.3 g.

EXAMPLE 31

A 1 mole/l solution of triisobutylaluminum in toluene was mixed with 3 molar equivalents of dioxane at room temperature, followed by the addition of 0.25 molar equivalent of succinimide. The reaction was allowed to continue at 60° C. for 1 hour to obtain a liquid catalyst.

A reactor was supplied with 6.5 g. epichlorohydrin, 4.1 g. propylene oxide and 65 g. chlorobenzene, further followed by the addition of 0.7 millimole, relative to the aluminum, of the above liquid catalyst. The mixture was reacted at the temperature of 30° C. for about 24 hours. At the end of the reaction time steam was forced into the contents of the reactor to purge the unreacted monomers and chlorobenzene, whereupon a solid polymer was obtained. This product was dried at 60° C. under reduced pressure to obtain 0.8 g. of an epichlorohydrin-propylene oxide copolymer.

EXAMPLE 32

The reaction mixture of triisobutyl aluminum with 3 molar equivalents of dioxane was further mixed with 0.25 molar equivalent of succinimide, and the mixture was reacted at 40° C. for 1 hour. A reactor of 3 l. capacity was charged with 2,300 g. chlorobenzene and 462 g. epichlorohydrin, followed by the addition of 25 millimole, relative to the aluminum, of the above catalyst.

The reaction was conducted at the temperature of 30° C. for 22 hours, and the resulting reaction mixture containing an epichlorohydrin polymer was treated in the same manner as in Example 1. The conversion of the monomer to the epichlorohydrin polymer was 87 percent. The reduced specific viscosity (R.S.V.) of the epichlorohydrin polymer as measured in nitrobenzene at 30° C. was 10.7 d¹./g.

The epichlorohydrin polymer obtained above was compounded with the agents shown in Table 8 using an open roll. The resulting compound was press-vulcanized at 155° C. for 45 minutes. The physical properties of the cured product are set forth in Table 8. It will be seen that the product has excellent properties.

TABLE 8

| I. | Formulation | |
|---|---|---|
| | Polyepichlorohydrin | 100 parts |
| | Fast extruding furnace black | 50 parts |
| | Nickel dibutyl-dithio-carbamate | 1 parts |
| | Red lead | 5 parts |
| | 2-Mercaptimiclazoline | 1.5 parts |
| II. | Physical Properties | |
| | Tensile strength | 188 kg./cm.² |
| | Elongation at break | 220% |
| | Modulus at 100% | 74 kg./cm.² |
| | Permanent set (100% elongation) | 1% or less |
| | Aged at 150° C. for 72 hrs. | |
| | Tensile strength | 205 kg./cm.² |
| | Elongation at break | 160% |
| | Weight change | |
| | in water | + 0.7% |
| | in ASTM No. 3 oil | +20.4% |

What is claimed is:

1. A process for polymerizing monoepoxides, wherein the epoxy group is an oxirane ring comprising the step of homopolymerizing or copolymerizing one or more of said monoepoxides, in the presence of a catalyst formed by reacting a cyclic imide selected from the group consisting of succinimide, glutarimide, adipimide, maleinimide, malonimide phthalimide, and N-halogen substitution products thereof with the reaction product of a hydrocarbon aluminum compound selected from the group consisting of trialkyl aluminums and dialkylaluminums with an ether selected from the group consisting of cyclooxabutane, tetrahydrofuran, tetrahydropyran, dioxane, dioxolan, diethylether, diisopropylether, anisole, phenetol, diphenylether, ethylene, glycol dimethylether, diethylene glycol dimethylether, and triethylene glycol dimethylether.

2. A process as claimed in claim 1, wherein said reaction product is prepared by reacting said hydrocarbon aluminum compound with said ether in the molar ratio of 1:0.3 to 20 on the basis of hydrocarbonaluminum compound.

3. A process as claimed in claim 1, wherein the molar ratio of said reaction product of hydrocarbon aluminum compound and ether to said imide ranges from 0.01 to 2 based on the hydrocarbon aluminum compound contained in said reaction product.

4. A process as claimed in claim 1, wherein the reaction between said hydrocarbon aluminum compound and ether and the reaction between the resulting reaction product and imide are carried out in the presence of an inert diluent selected from the group consisting of hydrocarbons and halogenated hydrocarbons.

5. A process as claimed in claim 1, wherein said hydrocarbon aluminum compound is a member selected from the group consisting of triisobutyl aluminum and diisobutylaluminum hydride.

6. A process as claimed in claim 1, wherein said ether is a member selected from the group consisting of dioxane and tetrahydrofuran.

7. A process as claimed in claim 1, wherein the reaction mixture of said imide with said reaction product of a hydrocarbon aluminum compound and an ether is used as the catalyst only after it has undergone a change in color.

8. A process as claimed in claim 1, wherein the catalyst is used in an amount ranging from 0.05 to about 10 molar percent on the basis of the hydrocarbon aluminum compound used relative to the epoxide monomer.

9. A process as claimed in claim 1, wherein the polymerization reaction is conducted at a temperature of from −100° to +200° C. and under the pressure of from 0.01 to 200 atmospheres.

10. A process as claimed in claim 1, wherein a member selected from the group consisting of ether, hydrocarbons and halogenated hydrocarbons is used as an inert diluent for the polymerization reaction.

11. A process as claimed in claim 1, wherein the epoxide is selected from the group consisting of epichlorohydrin, ethylene oxide and propylene oxide.

12. A process which comprises polymerizing epichlorohydrin in the presence of, relative to the epichlorohydrin monomer, 3 to 7 percent by mole of a catalyst obtained by the reaction of the reaction product of triisobutylaluminum and dioxane with succinimide in the molar ratio of 1:0.1 to 1 on the basis of the triisobutylaluminum.

* * * * *

UNITED STATES PATENT OFFICE
CERTIFICATE OF CORRECTION

Patent No. 3,644,224          Dated February 22, 1972

Inventor(s) Hiroshi Hani et al

It is certified that error appears in the above-identified patent and that said Letters Patent are hereby corrected as shown below:

Claim 3, cancel line 2; line 3, change "and ether to" to --of-- and after "imide" insert --to said reaction product of hydrocarbon aluminum compound and ether--

Signed and sealed this 25th day of July 1972.

(SEAL)
Attest:

EDWARD M. FLETCHER, JR.
Attesting Officer

ROBERT GOTTSCHALK
Commissioner of Patents